L. L. UPSHAW.
COTTON HARVESTER.
APPLICATION FILED JULY 14, 1913.
1,092,762.
Patented Apr. 7, 1914.
5 SHEETS—SHEET 3.
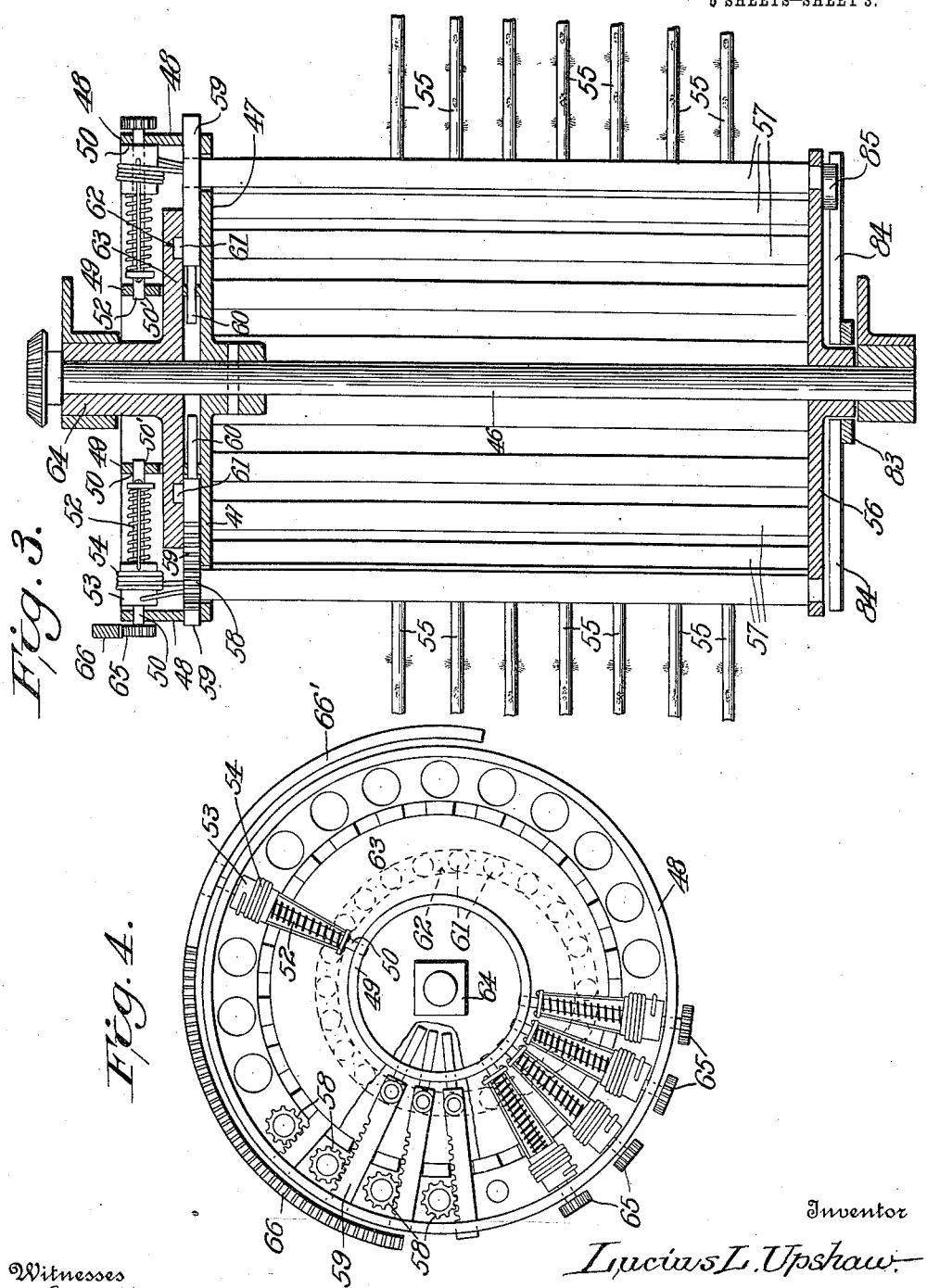
Witnesses
C. N. Walker.
G. Manning
Inventor
Lucius L. Upshaw
By T. Walter Fowler
Attorney
COLUMBIA PLANOGRAPH CO., WASHINGTON, D. C.

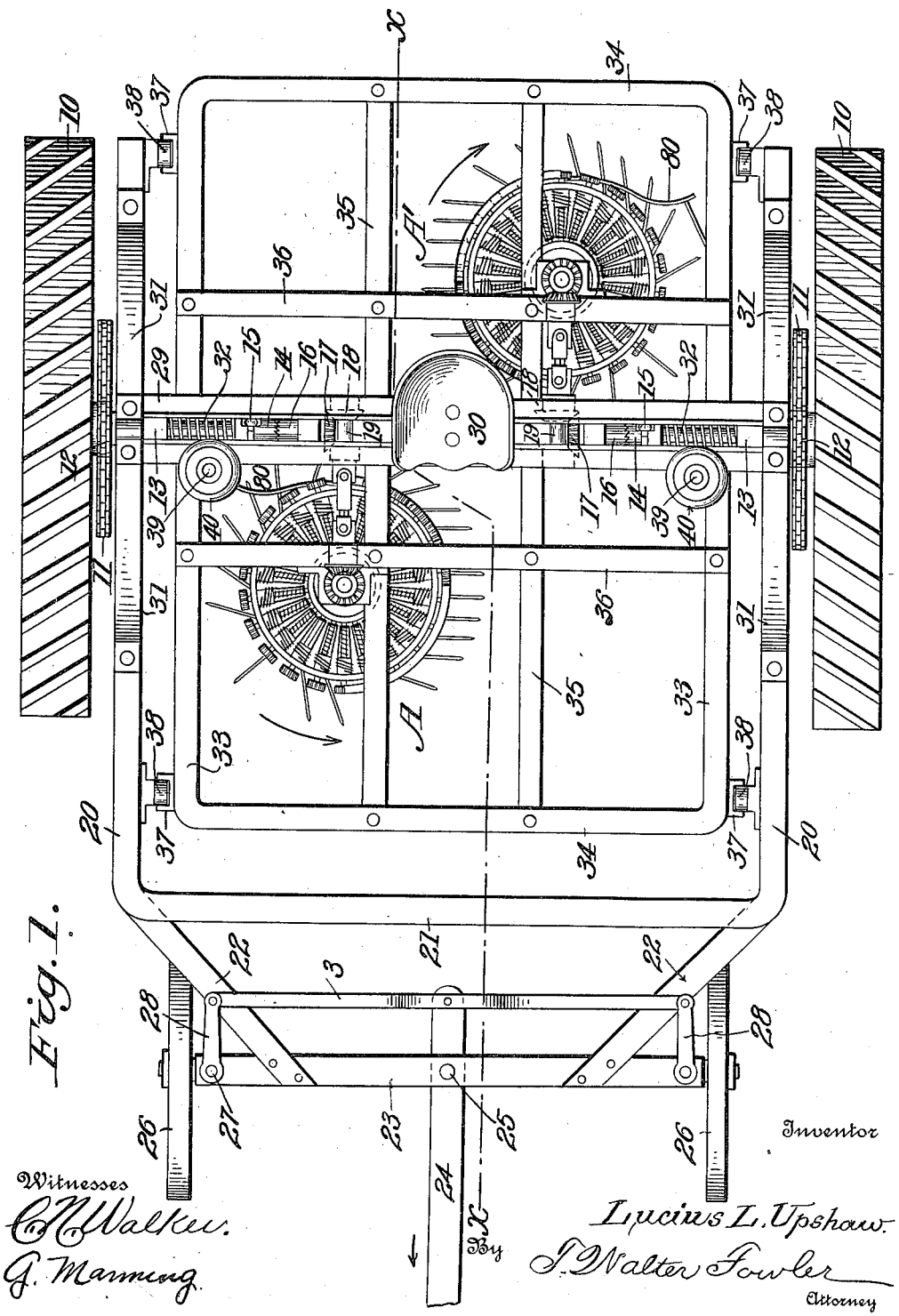

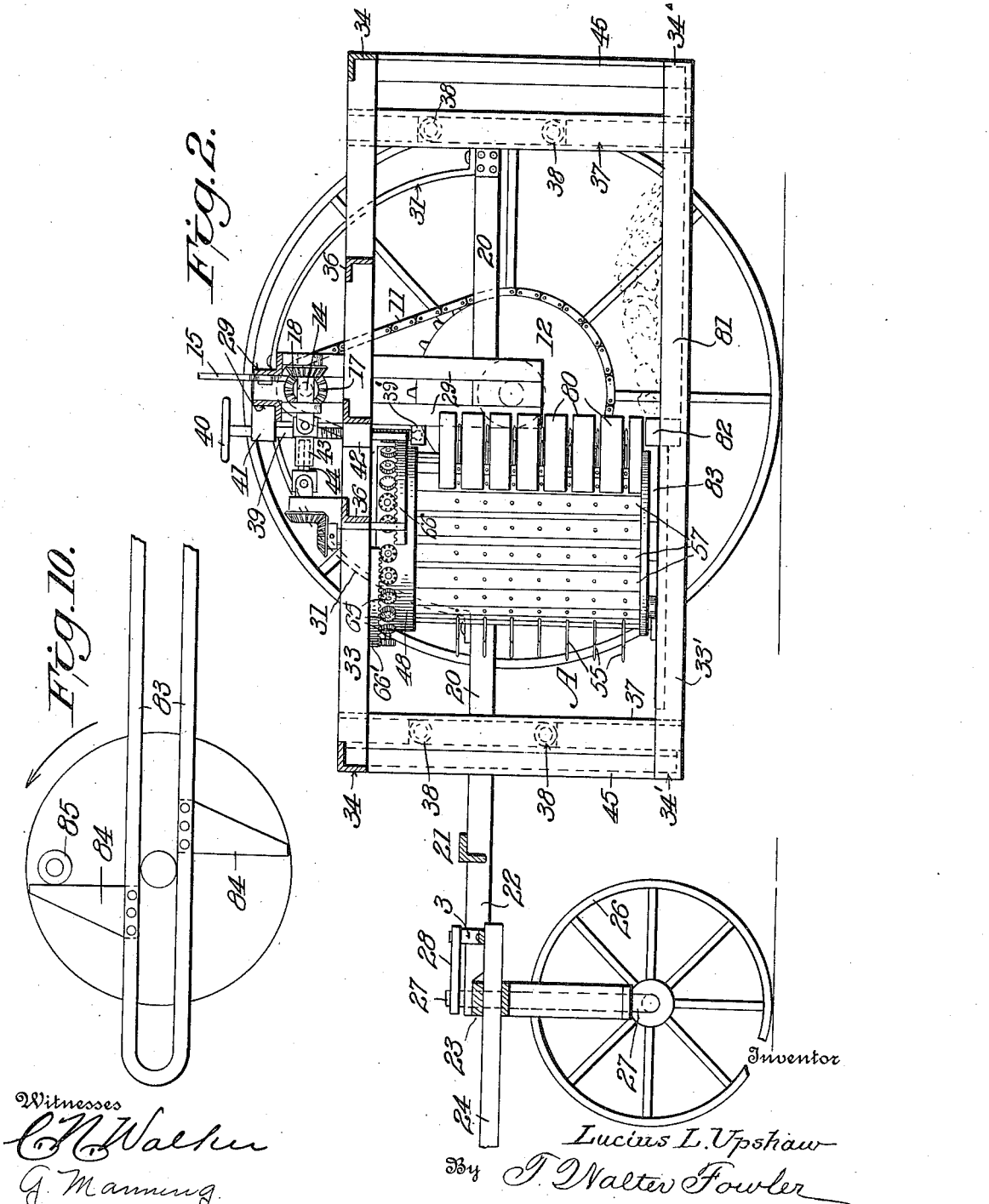

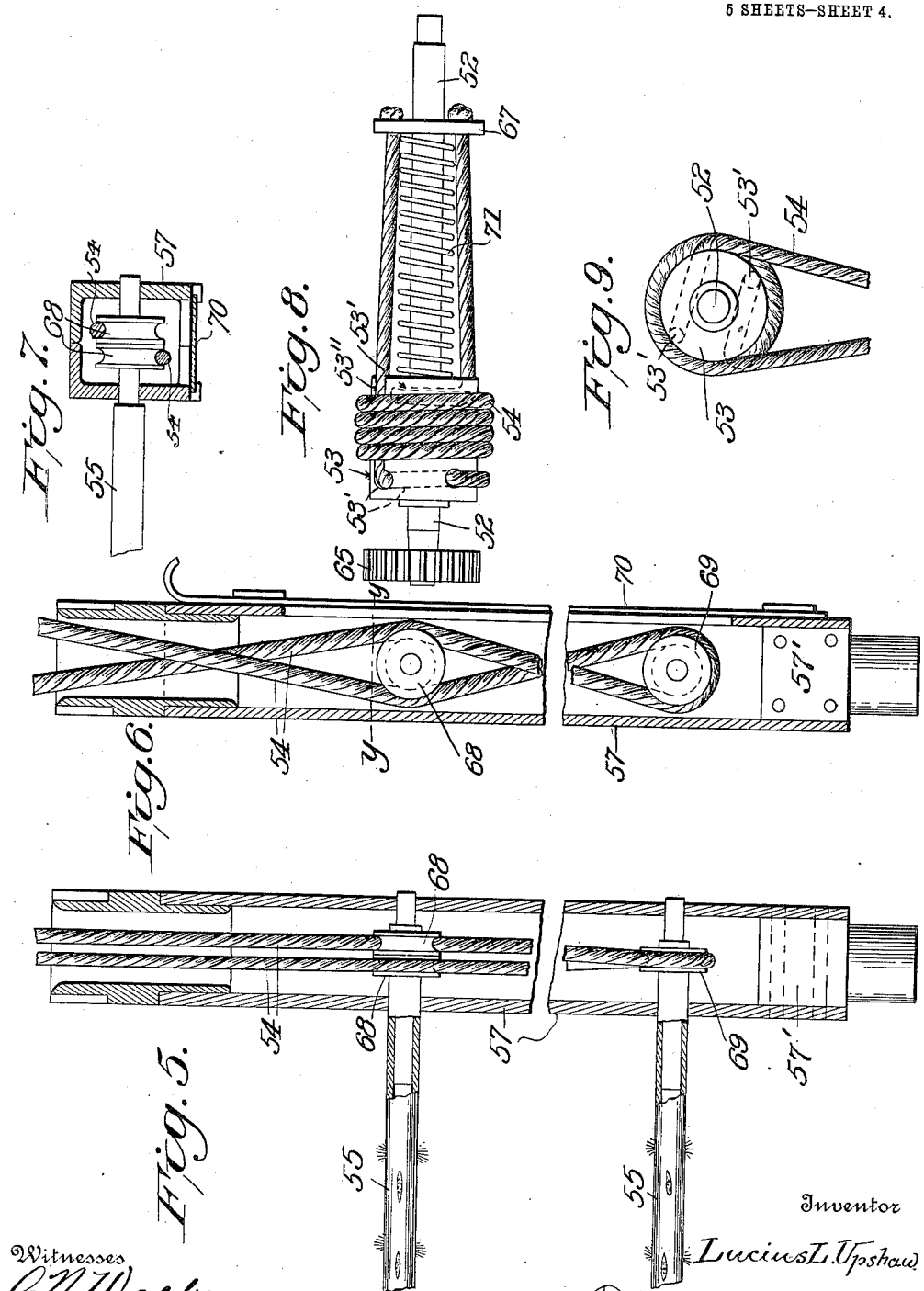

L. L. UPSHAW.
COTTON HARVESTER.
APPLICATION FILED JULY 14, 1913.
1,092,762.
Patented Apr. 7, 1914.
5 SHEETS—SHEET 5.
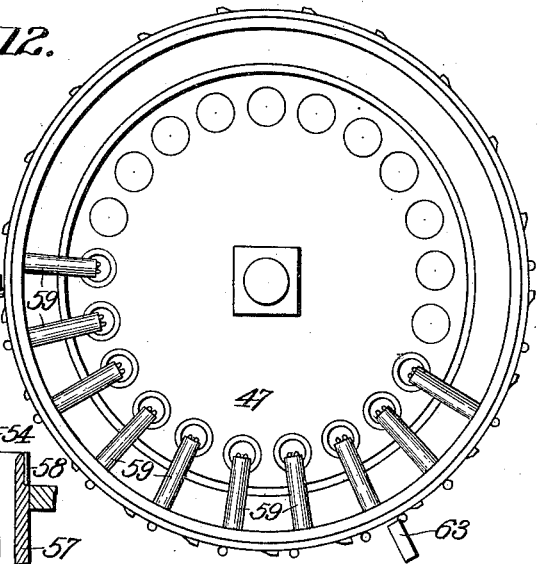
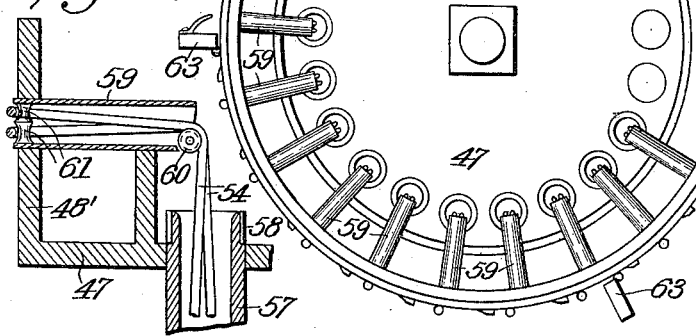
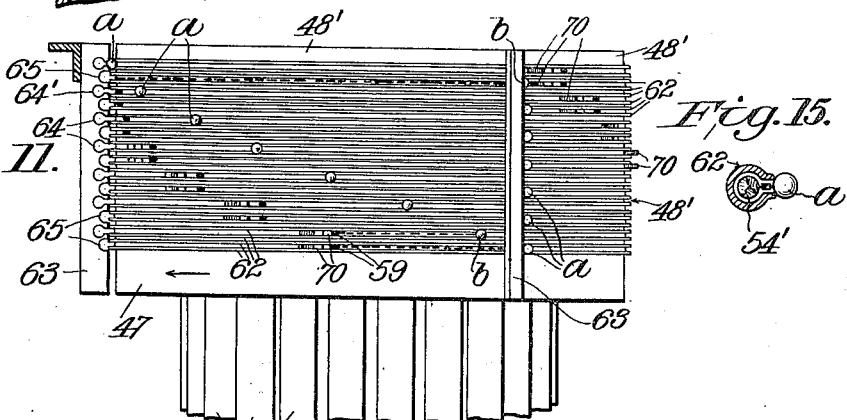
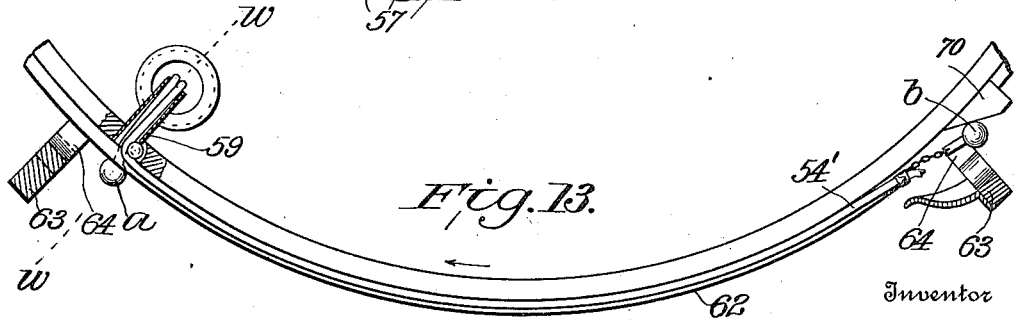

UNITED STATES PATENT OFFICE.

LUCIUS L. UPSHAW, OF DENISON, TEXAS.

COTTON-HARVESTER.

1,092,762.  Specification of Letters Patent.  Patented Apr. 7, 1914.

Application filed July 14, 1913. Serial No. 779,012.

*To all whom it may concern:*

Be it known that I, LUCIUS L. UPSHAW, a citizen of the United States, residing at Denison, in the county of Grayson and State of Texas, have invented certain new and useful Improvements in Cotton-Harvesters, of which the following is a specification.

This invention relates to certain new and useful improvements in machines designed for the harvesting of the cotton crop and the invention consists of the parts and the constructions, arrangements and combinations of parts which I will hereinafter describe and claim.

In the accompanying drawings forming part of this specification and in which similar reference characters indicate like parts in the several views;—Figure 1 is a top plan view of a cotton harvesting machine embodying the salient features of my invention. Fig. 2 is a longitudinal vertical sectional view of the same on the line X—X of Fig. 1. Fig. 3 is an enlarged vertical sectional view of one of the rotatable heads carrying one set of picking mechanism. Fig. 4 is a top plan view of Fig. 3, showing parts broken away and showing certain of the picking devices omitted. Fig. 5 is a vertical sectional view of the lower part of one of the picker spindle carriers showing several of the spindles in position and showing a means for imparting rotation to the spindles. Fig. 6 is a similar view taken at right angles to Fig. 5, showing one side of the lower portion of the spindle carrier open to give access to the interior of the carrier and showing a sliding cover for the open side of said carrier. Fig. 7 is a cross sectional view on the line Y—Y of Fig. 6. Fig. 8 is a top plan view of a rotatable shaft around which the actuating cord for a picker spindle is adapted to be alternately reversely wound and showing means for preserving the tension of said cord. Fig. 9 is an end view of Fig. 8, with the pinion omitted. Fig. 10 is a detail in plan of the stem of a plunger for discharging the picked cotton, and means for actuating the same. Fig. 11 is a side elevation of the upper portion of a rotatable head showing a modified and preferred form of mechanism for rotating the picking spindles. Fig. 12 is a top plan view of Fig. 11. Fig. 13 is an enlarged top plan view of a portion of the rotatable head of Fig. 12. Fig. 14 is a sectional view on the line W—W of Fig. 13. Fig. 15 is an enlarged cross-section of one of the guide tubes for the rope or cable, 54'.

In carrying out my invention the various parts of the machine may receive power and actuation from the traction of the main or supporting wheels of said machine, and to this end the traction wheels, 10, may be of any approved construction with tread surfaces adapted to engage the ground so that as the machine is drawn thereover, the wheels will be positively rotated without liability to slippage. The hubs of the wheels may be provided with sprocket wheels, 11, and each of these latter wheels is designed to drive a smaller sprocket wheel, 12, mounted on a horizontal shaft, 13, extending across the top central portion of the machine, said transverse shaft carrying a clutch mechanism which comprises a slidable clutch member, 14, actuated by a suitable lever, 15, said clutch member engaging a companion member, 16, adapted to be fixed to the shaft in any well known manner, said transverse shaft carrying at its inner end a beveled pinion, 17, adapted to mesh with a beveled gear, 18, upon one end of a shaft, 19, extending longitudinally of the machine, said shaft, 19, being, preferably, of a tumbling-rod order so that it may be flexible to accommodate itself to the up and down adjustments of a movable part of the frame of the machine, which I will hereinafter describe.

The main frame of the machine is designed to be stationary and it may be composed of any suitable material and may have any appropriate design, size and strength. As shown in Fig. 1, this frame comprises two side members, 20, connected at the front by a transverse portion, 21, and projecting forwardly of the sides are the extensions, 22, which are connected to a front bolster or like part, 23, to which is appropriately connected by a king-bolt, or otherwise, the tongue, 24.

At the front of the machine are suitable steering wheels, 26, which are journaled on the crank ends of vertical rods or turning posts, 27, suitably mounted in the main frame, the upper ends of the turning posts having lever arms, 28, fixed to them and the free ends of these arms being connected to an arch-shaped cross bar, 3, which extends from the lever-arm at one side of the machine to the corresponding arm at the other side of said machine, the central portion of the arched bar being in turn suitably connected to the rear extended end of the tongue, whereby the steering wheels are operated in response to the movements of the team to the right or left in the manner well known to agricultural implements and like machines.

The main frame of the machine is designed to be rigid and as light as consistent with the work a machine of this character is designed to perform. It may be constructed of angle-iron or of other appropriate material and it includes parallel arched bars, 29, of like material which extend transversely over the center of the machine and brace the sides of the main frame and also form a suitable support for the driver's seat, 30, and such other accessories as may be provided.

In addition to the foregoing and in order to give greater stability to the machine, I may employ curved braced bars, 31, which have one end bolted or otherwise fixedly secured to the side members of the main frame and have their upper ends bolted or otherwise rigidly secured to the members of the arched bar before mentioned, the arched bar being designed to support the transverse shafts, 13, of which there is one at each side of the machine, together with the clutch mechanism before mentioned, and said shafts, 13, being each provided with a spring, 32, by which the movable clutch member, 14, may be held in proper engagement with the companion clutch member, 16, when the lever, 15, has been actuated to permit the engagement of these parts. When said lever is moved to disengage the clutch member, 14, from the companion member, 16, the spring is under tension and the lever may be held by any appropriate and well known means, thus disconnecting the power of the machine from the picking mechanism which I will presently describe.

Interior to the rigid main frame is a supplemental frame, consisting of parallel sides, 33, and parallel ends, 34, and intermediate parallel longitudinal and transverse bars, 35—36, respectively, said supplemental frame having channeled guides, 37, on its outer sides near the corners adapted to be engaged by antifriction rollers, 38, journaled on the inner sides of the main frame, as shown in Figs. 1 and 2, whereby the inner or supplemental frame may be vertically raised and lowered relatively to the main frame and to the ground and to the height of the growing cotton plants, this adjustment of the supplemental frame being accomplished by any suitable means, as for instance, by the employment of vertical screws, 39, having operating hand wheels, 40, at the top within the ready access of the operator, said screw shafts, 39, passing through guides, 41, fixed to the arch members, 29, and the threaded portion of the shaft operatively engaging an internally threaded nut, 42, fixed to the adjustable frame, as shown in Fig. 2, and the lower end of the screw shaft being swiveled or otherwise rotatably stepped in a bracket or bearing, 39', on some appropriate part of the fixed frame, as for instance, on the down-turned sides of the arch, 29. From this description it will be understood that by manipulating the hand wheel, 40, of which there is one at each side of the machine, the screw shaft, 39, will be rotated and by working in the fixed nut, 42, which is carried by the adjustable frame, the latter will be raised and lowered in a vertical plane until the desired vertical adjustment of the picking devices hereinafter mentioned has been accomplished.

In order that the adjustment of the supplemental frame may occur, without disturbing the operative position of the driving devices, the tumbling shafts, 19, are preferably made of two parts, one part, 43, being sleeved upon the other part, 44, which latter may be of square or angular cross section to fit a corresponding cavity in the companion part, 43, whereby one part of this shaft may slide relatively to the other part so that the shaft may lengthen and shorten in response to the up and down movements of the supplemental frame, while maintaining the driving connections in operative engagement.

In my former Patent No. 1,041,202, October 15, 1912, I have disclosed a cotton harvester wherein is employed a fixed frame and a vertically adjustable frame mounted therein, said adjustable frame carrying picking mechanism, but instead of using the endless belts and picking devices of the aforesaid patent, I now use as a substitute therefor, a pair of rotatable vertically-disposed heads, A, A', each of which rotates in a circular path, one of said rotatable heads being mounted on an axis at one side of the longitudinal as well as the transverse center of the machine, and the other head being mounted upon an axis at the other side of the longitudinal and transverse center of the machine one of these heads having picking mechanism adapted to operate upon the growing plants from one side thereof, and the other picking head adapted to operate upon the plants from the opposite side and after the plants have passed beyond the range of action of the picking devices of the first-named head, thereby enabling me to operate upon the plants from opposite sides and to reach every portion of the plants so as to increase to the maximum the intended function of the machine. Each of the picking heads is shown as of substantially cylindrical form, but the cross sectional form of the head might be varied without departing from the spirit of my invention. The head has sufficient length to practically occupy the entire space between the upper and lower members of the supplemental frame, it being understood that this supplemental frame has a bottom section composed of parallel side members, 33′, and parallel end members, 34′, corresponding to the like members, 33 and 34, before mentioned, and which are joined to the latter by suitable vertical members, 45, thus making an open box-like structure of the supplemental frame and within which structure the rotatable heads are contained. Each of the heads is carried by a vertical shaft, 46 (Fig. 3) and each head comprises a suitable disk, 47, having concentric spaced upstanding flanges, or rims, 48—49, both of which have an annular series of perforations, 50, 50′, in which are appropriately guided the opposite ends of suitable shafts, 52, said shafts being formed with enlarged portions, 53, around each of which is designed to be coiled alternately in opposite directions a cord or cable, 54, for operating the picking fingers, 55, which I will hereinafter specifically describe. Each of the rotatable heads also has a bottom disk, 56, and between this disk and the upper disk, 47, extend the picker spindle carriers, 57, which carriers are preferably in the form of tubes, as shown in Figs. 5, 6 and 7, closed at the lower ends by a plug, 57′, or otherwise, and being pierced at suitable distances apart between its ends to receive the aforesaid picker spindles, 55, and which spindles may be of any well known type and may follow more or less closely the picking spindles of my former application Serial Number 717,029, filed August 26, 1912, and which spindles are not herein shown in detail. The picking spindle carriers, 57, are arranged in parallel order to form substantially a cylinder and each of these carriers supports and is designed to operatively carry a vertical row of parallel picking spindles, the inner ends of the spindles being provided with pulleys which are housed within the tubular carriers, 57, and around which pulleys pass the cord or cable, 54, before mentioned, and by the manipulation of which an independent rotation about a horizontal axis is given the picker spindles coördinately with the rotation of the head about its axis, 46, and also the oscillation of the rows of picker spindles to cause them to change their angle, which oscillation is accomplished by providing the upper end of the carrier with a pinion, 58, adapted to be engaged by a horizontal rack, 59, the inner end of which has a reduced stem, 60, suitably guided in an opening formed in the inner annular flange, 49, of the disk, 47; the outer end of the rack bar, 59, is also guided in a perforation formed in the annular flange or rim, 48, before mentioned, and said rack is provided with a stud or antifriction roller, 61, adapted to engage a cam groove, 62, in a disk, 63, superposed above the disk, 47, and having an upwardly extending hub, 64, which is preferably square or many-sided in cross section and which is designed to engage in a corresponding socket formed in the top frame bars of the supplemental adjustable frame, whereby the cam disk is held in fixed position. It will be observed from Fig. 4, that the rack bars are radially disposed and that they extend in series throughout the circumference of the disk, 47, and that each of the rack bars will be arranged and constructed as before described and that one of said bars will be provided for each of the picker spindle carriers, 57, with its pinion, 58. From the arrangement of these parts and considering that the cam disk, 63, is stationary, it will be apparent that as the disks, 47 and 56, are rotated by reason of their connection with the shaft, 46, to which the power is applied, the studs or antifriction rollers, 61, will be caused to engage different parts of the cam groove during said rotation and the rack bars will be accordingly moved in and out during the time the studs, 61, are engaged by the higher part of the cam, and by this movement they will impart rotation to the pinions, 58, and partial rotation to the picker spindle carriers, 57, and as the latter carry the picker spindles, 55, it will be manifest that these spindles will be given an oscillation in a horizontal plane to change their angle as shown in Fig. 1 at the same time that the heads are revolved about the axis of the shaft, 46. This change of angle of the picking spindles is from substantially radial, as in Fig. 1, to a more or less tangent to the periphery of the head and it begins to occur just before the spindle enters the stripping devices which remove the cotton from the spindles and there is a gradual change in the angle of the spindles so that they may be drawn substantially at right angles through the stripping devices and the angle to gradually change until just before the spindles are again in position to enter the plants, thereby they may be projected into the plants in a plane substantially at right angles thereto.

In order that each of the picker spindles, 55, may be given a rotation about its own axis, I provide the outer ends of the shafts, 52, with pinions, 65, as shown in Figs. 3, 4 and 8, adapted to engage suitable racks, 66, 66′, positioned above and below said pinions. In other words, one of the racks, 66, extends part way around the circle described by the outer end of the shaft, 52, and has its rack surface presented upwardly while the other rack, 66′, is in a lower plane than the rack, 66, but forms substantially a continuation thereof. The purpose of this construction is that in one part of the travel of the rotary head carrying the picker spindles, the upper parts of the pinions, 65, on the outer ends of the shafts, 52, engage one of the racks from below and as the head continues to move and the pinion to operate over said rack, the pinion and its shaft are rotated and thus coil the cord or cable, 54, upon the enlarged head, 53, of the shaft, in one direction, and when each pinion, 65, passes from the rack, 66, its under portion at once enters into engagement with the other rack, 66', which at once changes the direction of rotation of the shaft, 52, and results in the cord or cable, 54, being unwound from its first position and rewound in an opposite direction, thus rotating the shaft, 52, oppositely from the direction in which it is first rotated. The cord or cable has one end secured to a plate, 67, (Fig. 8) and thence extends substantially parallel with the shaft, 52, to the head, 53, which latter has an opening formed transversely through it at one side of the center and the cord passes through this opening and is then wound spirally around the head as many times as may be desired and thence extends downwardly into the tubular or hollow spindle carrier, 57, and around one side of one of the grooved pulleys, 68, and is thence carried to and around a pulley, 69, on the inner end of the lowermost picking spindle. From this pulley, 69, the rope or cable is carried upwardly crossing a companion part and passing around another of the crossed pulleys, 68, of other picking spindles and finally it emerges from the open top of the tubular carrier and through the pinion thereon and is directed through an opening, 53', made transversely through the enlarged head, 53, of the shaft, 52, and is carried along a groove, 53" in said head and parallel with the other end of the cord and is secured to the aforesaid plate, 67. The arrangement is such that when the pinion on the outer end of one of the shafts, 52, is engaged by the rack, 66, the shaft is rotated in one direction to cause the cord to wind up on the enlarged head of the shaft in one direction during the time the pinion is in engagement with said rack and when the pinion disengages this rack and engages the oppositely placed rack, 66', the pinion while traveling over the second rack is rotated in an opposite direction and the before-mentioned cord is unwound from the enlarged head of the shaft and is rewound in an opposite direction. The result of the two operations is that the picker spindles are caused to rotate first in one direction and then in the other and when the rotation is in one direction the pull is upon one of the runs of the cord in the picker spindle carrier, 57, and when the rotation is in the opposite direction the pull is upon the other run of said cord, and as the runs of the cord cross each other in the spindle carriers so that they engage the spindles, 68, at opposite sides of the center, when the pull is in one direction the picker spindle is rotated about its own axis in one direction and at the termination of the rotation in this direction it is at once rotated in the opposite direction. The object of this rotation is that when the picker spindles are roaming about in the cotton plants and are picking up the loose cotton from the boll, if they are rotated in one direction only there would be a tendency of these spindles picking up leaves and fragments of the boll and entraining them in the cotton, which would necessitate a separation of these particles by subsequent process, but by rotating the picker spindles first in one direction and then in the other, it is apparent that if any leaves or broken pieces of boll should be mixed with the cotton during such rotation, the reverse rotation will result in the unwinding of the cotton and will give the leaves or other foreign matter opportunity to detach themselves from the cotton during said unwinding. A great deal of the foreign matter is thus gotten rid of and a better grade of material is the result.

In order that access may be given the pulleys, 68 and 69, and the cable properly rove through the pulleys, I prefer to make one side of the picker spindle open as shown in Fig. 6, and to employ a sliding cover, 70, to close this opening and exclude dirt and foreign matter. It will also be observed from Figs. 3, 4 and 8, that the plate, 67, to which the ends of the cord or cable, 54, are connected is held under tension by a spring, 71, coiled about the shaft, 52, and bearing between said plate and the enlarged head of said shaft. The purpose of this spring is to take up any slack in the cord during the winding and unwinding of said cord upon the enlarged portion or head of the shaft. It will be understood from Fig. 4 that the shafts, 52, with their spindles and other adjuncts are fixed in spaced relation around the flanged disk, 47, and that each of said shafts is disposed directly over one of the aforesaid rack bars, 59.

While I have described in detail one mechanism for effecting the rotation of the picking spindles, I wish it understood that my invention is not restricted to the particular devices already described and shown in Figs. 1, 2, 3, 4 and 8 of the drawings, but that I feel at liberty to employ other means for giving the desired movement to said spindles. As a matter of fact I have shown in Figs. 11 to 15, inclusive, another type of mechanism intended for this same purpose and which I regard as a preferred mechanism for rotating the spindles. In said figures, the disk, 47, at the upper end of the rotary head has a very deep flange, 48', which flange forms a cylindrical extension of the disk, and the picker spindle carriers, 57, enter the flange, 47, and are provided with the pinions, 58, as in Fig. 3. The cord or cable, 54, emerges from the top of the picker spindle carriers and the ends of the rope are directed through laterally-extending tubes or conductors, 59, leading from the upper ends of the carriers, 57, to the circumference of the cylinder or flange, 48', suitable direction pulleys, 60—61, being employed over which the ends of the cable pass so as to reduce the friction of the cable to a minimum. The circumference of the flange or cylinder, 48', is provided with a series of parallel channels or slotted tubes, 62, each of which is designed as a guide for one end or portion of each of the ropes or cables, 54, which rotate the picker spindles. The ends of the cable are first brought through the tube, 59, and each end is then laid in its respective groove or slotted tube, 62, and one end of the cable is then drawn along its tube until the enlargement or button, a, on the other end of the same cable is drawn in until it rests substantially opposite the outer end of the tube, (as in Fig. 13), where it is in position to be engaged and held during the further rotation of the head whereby during this continued rotation of the said head the first-mentioned and now slack part of the cable will be drawn back loosely along its channel or slotted tube and until the enlargement or button, b, thereon will have come at rest in front of the open end of the tube, 59. During this movement of the first mentioned end of the cable the head will have made substantially a one-third rotation and this will have brought the button or enlargement, b, in position corresponding in position to the button, a, in Fig. 13, where it may be caught and held by a plate, 63. There are two of the plates, 63, of similar construction and the distance between these plates is about equal to one-third of the circumference of the drum or flange, 48'. The plates are designed to be fixedly held by being secured to some rigid part of the framework and each of the plates is provided with a series of openings, 64, with narrowed slots leading therefrom through the inner edge of the plate. Each of the openings, 64, stands opposite one of the channels, or slotted tubes, 62, in which one part or end of the cable is designed to travel, and the plates, 63, are provided with other openings, 65, in the inner edge adjacent the openings, 64, and in line with the channel or slotted tube, in which the other end of the cable or rope is designed to operate, the plates, 63, having as many openings corresponding to 64 and 65, as there are cables and enlargements to be accommodated. In Fig. 13 the buttons or enlargements, a, shown are supposed to be those on one end of each of the cables, 54, these buttons or enlargements being arranged in spiral order and this arrangement may be continued throughout the circumference of the drum, so as to afford the necessary clearance space in the operation of the buttons and cables. The buttons or enlargements, b, in Fig. 13, are supposed to be those on the other end of the cables and they reach the position shown in the following manner: During the rotation of the drum, 48', the button or enlargement, a, of one cable will be caught by the plate, 63, and the button will thus be held during the further rotation of the drum. This will result in this end of the cable being pulled out and the picker spindles connected to this cable will be rotated in one direction; the rotation continues until the button or enlargement, a, has been moved along its channel or slotted tube until it has reached a position corresponding to that indicated at the right of Fig. 13. To make this operation clear and referring to said Fig. 13, which is an enlarged view of a portion of the circumference of the drum, 48', and one of the cables, 54, with its enlargements on the opposite ends thereof, one of the buttons or enlargements, a, is shown as standing opposite a tube, 59, through which the cable passes which indicates that this end of the cable has been drawn in. The other end of the cable has been carried along the tube or guide by being held by a plate, 63, during the rotation of the drum. As the head continues to rotate, the button, or enlargement, a, is caught in the contracted portion of the opening, 64, of the left hand plate, 63, and as the head continues in motion, past the left-hand plate, 63, the end of the cable, carrying the button, a, is drawn out. Before this occurs, however, the opposite end of the same cable must be released from its engagement with the other plate, 63, and this is accomplished by providing a cam-shaped lug, 70, on the circumference of the drum in line with each tube, 62, which lug during the rotation of the head comes into contact with the button or enlargement, b, and forces the same to one side so that it is brought into register with the enlarged portion of the opening, 64, and the button immediately passes through this opening and this end of the cable is thus free to move inwardly in response to the pull upon the other end of the cable due to the plate, 63, engaging and holding the button, a, of the last mentioned end of the cable.

Referring to the topmost of the cables, 54, in Fig. 11, it will be seen that the button, a, at one end is in position to be engaged by the plate, 63, while the button, b, at the other end is supposed to have been carried forward or been advanced to the position shown and which position represents the limit of outward movement of this button and indicates that the rope has been drawn out to the right to its full extent. The button, b, is just about to be disengaged from its plate by the cam lug, 70, and this occurs just when the plate, 63, is about to engage the other button, a, on the same rope, so that as the drum continues to rotate, the button, b, is engaged and the end of the rope carrying the same is pulled outwardly while the other button, a, is being returned to normal position. In order that this may occur, it must pass plate, 63, which it is approaching and this is provided for by having this plate formed with the opening, 65, of sufficient size to allow the button, b, to pass through the opening on its way back to the particular tube through which its rope is passed after leaving the picker spindle carrier, 57. The cable shown at the lowermost part of the drum, 48′, in Fig. 11, indicates that one end of the cable has been pulled out to about half of its length and is being held by the plate, 63, so that it may be further pulled out during the rotation of the drum. The button, b, on the other end of this same rope is indicated as having passed the plate, 63, and as traveling back to its normal position which will be opposite the opening or tube, 59, to which this part of the cable is brought. This operation occurs with all of the cables and the result of the operation is that the picker spindles are rotated first in one direction and then in the other while in the vicinity of the cotton to be picked.

The cotton removed from the bolls by the picking spindles is taken from the latter by the stripping fingers, 80, in the manner well known in this art, and this cotton falls upon a bottom or trough, 81, just behind a plunger, 82, and which plunger is designed to feed this cotton toward the rear of the machine where it may be removed in any suitable manner. The plunger has a stem, 83, which I prefer to make of the slotted order as shown in Fig. 10, and it has two oppositely projecting lugs, 84, which are designed to be engaged by a stud, or crank pin, 85, on the bottom disk, 56, of the rotary head during the rotation of the latter, as shown in Fig. 10, whereby reciprocal movement is imparted to the piston rod and piston to cause the picked cotton to be advanced over the floor or trough of the machine.

Having thus described my invention what I claim as new and desire to secure by Letters Patent is:—

1. A cotton harvester having a frame and a plurality of vertical, horizontally revoluble members each provided with complementary picking devices, one of said members adapted to operate at one side and the other at the opposite side of a row of cotton plants, one of the members being arranged in advance of the other whereby its picking devices partially divest the plant of its cotton and the picking devices of the other member divest the plant of the cotton which has escaped the first-named picking devices, each of said picking devices including an annular series of picker spindle carriers, a vertical row of horizontal picker spindles rotatably mounted in each of the carriers, a cable connecting the spindles of each carrier in series, and means for imparting a see-saw motion to the outer ends of the cables.

2. A cotton harvester having a main frame, a supplemental frame within the main frame, and a plurality of vertical, horizontally revoluble members carried by the supplemental frame and each provided with complementary picking devices, one of said members adapted to operate at one side and the other at the opposite side of a row of cotton plants, one of the members being arranged in advance of the other whereby its picking device partially divests the plant of its cotton and the picking devices of the other member divest the plant of the cotton which has escaped the first-named picking devices, each of said picking devices including an annular series of picker spindle carriers, a vertical row of horizontal picker spindles rotatably mounted in each of the carriers, a cable connecting the spindles of each carrier in series, and means for imparting a see-saw motion to the outer ends of the cables.

3. A cotton harvester having a main frame, a supplemental frame within the main frame, and a plurality of vertical, horizontally revoluble members carried by the supplemental frame and each provided with complementary picking devices, one of said members adapted to operate at one side and the other at the opposite side of a row of cotton plants, one of the members being arranged in advance of the other whereby its picking device partially divests the plant of its cotton and the picking devices of the other member divest the plant of the cotton which has escaped the first-named picking devices, each of said picking devices including an annular series of picker spindle carriers, a vertical row of horizontal picker spindles rotatably mounted in each of the carriers, a cable connecting the spindles of each carrier in series, and means for imparting a see-saw motion to the outer ends of the cables, and means for vertically adjusting the supplemental frame and said members relatively to the main frame and to the height of the cotton plants.

4. A cotton harvester having a main frame, a supplemental frame mounted within the main frame, a plurality of vertical, horizontally-revoluble members carried by the supplemental frame, each of said members provided with complementary picking devices, one of said members adapted to operate at one side and the other at the opposite side of a row of cotton plants, one of the members being arranged in advance of the other whereby its picking devices partially divest the plant of its cotton and the picking devices of the other member divest the plant of the cotton which has escaped the first-named picking device, each of said picking devices including an annular series of picker spindle carriers, a vertical row of horizontal picker spindles rotatably mounted in each of the carriers, a cable connecting the spindles of each carrier in series, and means for imparting a see-saw motion to the outer ends of the cables, means for vertically adjusting the supplemental frame and the picking devices carried thereby relatively to the cotton plants, and vertical guides between the main and supplemental frames for accurately guiding the latter in its vertical adjustments.

5. A cotton harvester having a main frame, a supplemental frame, mounted within the main frame, a plurality of vertical, horizontally-revoluble members carried by the supplemental frame, each of said members provided with complementary picking devices, one of said members adapted to operate at one side and the other at the opposite side of a row of cotton plants, one of the members being arranged in advance of the other whereby its picking devices partially divest the plant of its cotton and the picking devices of the other member divest the plant of the cotton which has escaped the first-named picking devices, each of said picking devices including an annular series of picker spindle carriers, a vertical row of horizontal picker spindles rotatably mounted in each of the carriers, a cable connecting the spindles of each carrier in series, and means for imparting a see-saw motion to the outer ends of the cables, means for vertically adjusting the supplemental frame and the picking devices carried thereby relatively to the cotton plants, and vertical guides between the main and supplemental frames for accurately guiding the latter in its vertical adjustments, said adjusting means comprising vertical screw-shafts supported on the main frame, and threaded nuts on the supplemental frame engaged by the screw-shafts.

6. A cotton harvester having a frame and a plurality of vertical, horizontally-revoluble members mounted therein, each of said members comprising upper and lower heads and a connecting annular series of hollow spindle-carriers, and horizontal picker spindles mounted in said carriers and arranged one above the other in horizontal spaced relation, means for oscillating the picker spindles first in one direction and then in the opposite direction, said means including a cable operatively engaging the picker spindles, and means for imparting a see-saw motion to the outer ends of the cable, and means for oscillating the picker spindle carriers horizontally first in one direction and then in the opposite direction, the picker spindles of one of said members adapted to operate at one side and the picker spindles of the other of said members adapted to operate at the opposite side of a row of cotton plants, one of said members and its picker spindles being arranged in advance of the other members and its picker spindles, whereby the picker spindles of one member partially divest the plant of its cotton and the picker spindles of the other member divest the plant of the cotton which has escaped the first-named picker spindles.

7. In a cotton harvester, a picking mechanism comprising a vertically-disposed, horizontally-rotatable structure, said structure comprising upper and lower heads, and picker spindle carriers arranged in annular spaced relation, said carriers connecting said heads and being hollow and each of said carriers being provided with a vertical row of picker spindles, and means for oscillating the carriers, said means comprising pinions on one end of the carriers, racks slidably mounted in one of said heads, and engaging said pinions, and means for reciprocating the racks, and thereby changing the angle of the picker spindles as they enter and leave the plants, and means for rotating the spindles while the latter are in the plants.

8. In a cotton harvester, a picking mechanism comprising a vertically-disposed, horizontally-rotatable structure, said structure comprising upper and lower heads and connecting picker spindle carriers arranged in annular spaced relation, said carriers being hollow and each of said carriers being provided with a vertical row of picker spindles, and means for oscillating the carriers, said means comprising pinions on one end of the carriers and racks slidably mounted in one of said heads and engaging said pinions, a fixed member having a cam-groove engaging said racks for reciprocating the same, thereby turning the carriers and changing the angle of the picker spindles as the spindles enter and leave the plants, and means for rotating the spindles while they are in the plants.

9. In a cotton harvester, a picking mechanism comprising a revoluble structure having upper and lower heads and connecting picker spindle carriers arranged in annular series and each provided with a vertical row of picker spindles, said spindles having one end revolubly mounted in said carriers, and provided with pulleys, a cable passing around said pulleys from opposite sides and crossing at points between adjacent spindles, and extending through the upper end of the carrier, and means engaging with the opposite ends of said cable, adapted to alternately exert a pull upon opposite ends thereof whereby the picker spindles are vertically rotated first in one direction and then in an opposite direction.

10. In a cotton harvester a picking mechanism comprising a revoluble structure having upper and lower heads and an annular series of tubular picker spindle carriers mounted between said heads, picker spindles mounted in said carriers and arranged in parallel series one above the other, said spindles provided with pulleys within the carriers, a cable passing into each of said carriers and around said pulleys having its runs crossing at points between the pulleys of different spindles, the runs of the cable extending through the top of the carrier, said upper head being of substantially cylindrical form and provided with openings, each of the cables extending through one of said openings and provided with enlargements, means fixedly secured adjacent the circumference of said cylinder and arranged in the path of one of said enlargements adapted to engage the same and hold it during the rotation of the head whereby one run of the rope is pulled upon to impart rotation to the spindles in one direction, means fixedly secured adjacent the circumference of the cylinder and in the path of the enlargement on the other end of the cable adapted to engage said other enlargement and to hold the same during the continued rotation of the cylinder whereby the second run of the cable is pulled upon to cause the cylinders to rotate in one direction opposite to their first rotation, and means for releasing one of said enlargements from its engaging means, to allow said enlargements to return to normal position coördinately with the engagement of the other enlargement on the other end of the same cable.

11. A cotton harvester having a main frame, a supplemental frame arranged within the main frame, a plurality of vertical horizontally revoluble members each provided with complementary picking devices one of said members adapted to operate at one side and the other at the opposite side of a row of cotton plants, one of the members being arranged in advance of the other whereby its picking devices partially divest the plant of its cotton and the picking devices of the other member divest the plant of the cotton which has escaped the first-named picking devices, each of said picking devices comprising an annular series of picker spindle carriers, a vertical row of horizontal picker spindles rotatably mounted in each of the carriers, a cable connecting the spindles of each carrier in series, and means for imparting a see-saw motion to the outer ends of said cable, means adjacent each of said members for stripping the cotton from the picking devices, a plunger operable in the lower part of the supplemental frame for advancing the cotton delivered from the strippers, and means carried by said revoluble members for operating the plungers.

12. In a cotton harvester having a main frame, a supplemental frame mounted therein, a plurality of vertical, horizontally-revoluble members each provided with complementary picking devices, one of said members adapted to operate at one side and the other at the opposite side of a row of cotton plants, one of the members being arranged in advance of the other whereby the picking devices partially divest the plant of its cotton, and the picking devices of the other member divest the plant of the cotton which has escaped the first-named picking devices, each of said picking devices comprising an annular series of picker spindle carriers, a vertical row of horizontal picker spindles rotatably mounted in each of the carriers, a cable connecting the spindles of each carrier in series, and means for imparting a see-saw motion to the outer ends of said cable, means for vertically adjusting the picking devices relatively to the cotton plants, a vertical shaft by which the said members are carried, traction wheels upon which the main frame is supported, a shaft mounted in the supplemental frame and arranged parallel with the line of movement of the machine, means for transmitting power from the traction wheels to said second-named shaft, and gearing between the first and second-named shafts, said second-named shaft being flexible and extensible in response to the adjustment of the supplemental frame.

In testimony whereof I affix my signature in presence of two witnesses.

LUCIUS L. UPSHAW.

Witnesses:
T. WALTER FOWLER,
C. W. FOWLER.